United States Patent Office 3,536,699
Patented Oct. 27, 1970

3,536,699
ARALKYL-SUBSTITUTED LACTAMS AND CYCLIC UREAS AND PROCESS FOR THEIR PRODUCTION
Hanswilli von Brachel, Offenbach am Main, and Karl Hintermeier, Frankfurt am Main-Fechenheim, Germany, assignors to Cassella Farbwerke Mainkur Aktiengesellschaft, Frankfurt am Main-Fechenheim, Germany, a company of Germany
No Drawing. Filed July 14, 1967, Ser. No. 653,333
Claims priority, application Germany, July 16, 1966, C 39,625
Int. Cl. C07d 41/06
U.S. Cl. 260—239.3                                     1 Claim

ABSTRACT OF THE DISCLOSURE

Aralkyl compounds having the formula:

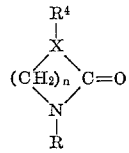

wherein:
X is $CR^4$ or N
R is H, lower alkyl or aralkyl
$R^4$ is H or

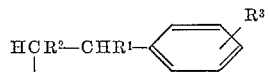

$R^1$ is H, lower alkyl or aryl
$R^2$ is H, lower alkyl or aryl
$R^3$ is H or lower alkyl
at least one of R and $R^4$ is

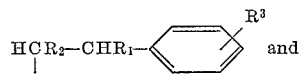 and $n$ is 1 to 7 have good thermal stability at moderately elevated temperatures and can be used as heat transfer liquids as well as high temperature solvent, plasticizers, dyeing auxiliaries and intermediates. The compounds are made by reacting lactams or cyclic ureas having a 4- to 10-member ring with a styrene having the formula

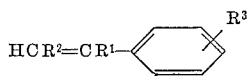

The present invention relates to the above-defined aralkyl substituted lactams and cyclic ureas, as well as to a process for their manufacture.

These new lactams and ureas are obtained by reacting at temperatures from about 50 to about 160° C., in the presence of alkaline catalysts, 4- to 10-membered lactams or cyclic ureas of the formula:

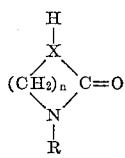

wherein X is CH or N, R is hydrogen, lower alkyl or aralkyl, and $n$ is an integer ranging from 1–7, with aryl conjugated olefins having the formula:

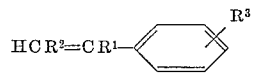

wherein $R^1$ and $R^2$ mean hydrogen, lower alkyl or aryl and $R_3$ is hydrogen or lower alkyl.

Should the lactams and cyclic ureas contain unsubstituted NH-groups, the aryl conjugated olefins preferentially add to these groups.

The addition of one mol of the aryl conjugated olefin to the foregoing lactam or cyclic urea takes place according to the following reaction:

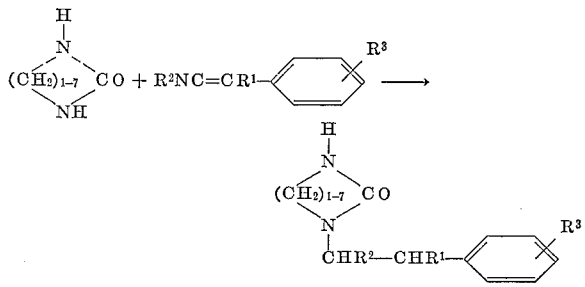

If the lactams are substituted at the nitrogen atom by a lower alkyl or aralkyl group, aryl conjugated olefins add to the carbon neighboring the CO-group. Where that carbon has two hydrogens it is also possible to add two aralkyl radicals to it.

The constitution of the adducts of the present invention has been verified by nuclear resonance and infrared spectra.

Typical lactams and cyclic urea starting materials for the process of the present invention include 2-pyrrolidinone, N-alkyl-2-pyrdolidinone, 2-piperidone, propiolactam, ε-caprolactam, ω-pelargolactam, ethylene urea, propylene urea.

As arylconjugated olefins for the foregoing process, the following styrenes are examples of those that may be used: styrene, α-methylstyrene, β-methylstyrene, α-phenylstyrene, β-butylstyrene, β-hexylstyrene, the vinyltoluenes, stilbene and α-phenyl-β-methylstyrene. Non-conjugated aryl olefins, for instance allyl benzene, which form aryl conjugated olefins in the reaction medium as by means of an intramolecular change, can also be used.

As alkaline catalysts there may, for example, be used alkali metal hydrides, amides and hydroxides; and organo-alkali-metallic compounds, chiefly alkali metal alcoholates, preferably the corresponding potassium compounds. They are added to the reaction mixture in quantities ranging from between 0.01–1 mol per mol of aryl conjugated olefin.

The following examples more fully illustrate the present invention. All temperatures are in degrees centigrade.

EXAMPLE 1

500 g. 2-pyrrolidinone and 50 g. potassium tertiary butylate are heated with stirring to 100–105° in a nitrogen atmosphere. Then, in the course of 2 houds, 156 g. (1.5 mol) styrene are added dropwise, and stirring is continued at 100–105° for 10 hours. In order to work up the reaction mixture, it is diluted with 500 cc. water, neutralized with hydrochloric acid, and extracted by shaking with chloroform. The chloroform extract is distilled through a column of the Vigreux type. The excess pyrrolidinone distills over first, followed by the desired reaction product which comes over at 115–120°/0.01 mm. in the form of a colorless oil. When cooled down, that oil solidifies to give colorless crystals having a melting point of 54–55°.

Yield: 217 g. N-phenethyl-2-pyrrolidinone (77% of the theoretical, based on the styrene).

Analysis.—Calcd. for $C_{12}H_{15}NO$ (percent): C, 76.1; H, 7.9; N, 7.4; O, 8.5. Found (percent): C, 76.0; H, 7.8; N, 7.3; O, 8.7.

In a similar way, α-methylstyrene adds to the 2-pyrrolidinone to produce N - (2 - phenylpropyl)-2-pyrrolidinone which is obtained in the form of a colorless oil that is easily soluble in cyclohexane and has a boiling point of 116–118°/0.01 mm.

EXAMPLE 2

396 g. N-methyl-2-pyrrolidinone and 30 g. potassium methylate are heated with stirring to 100–105° in a nitrogen atmosphere. Then 104 g. styrene (1 mol) are added dropwise in the course of 2 hours and stirring is continued at 100–105° for 10 hours. For working-up purposes the main quantity of the excess N - methyl-pyrrolidinone is distilled off under reduced pressure, the residue is diluted with 400 cc. iced water, neutralized with hydrochloric acid, and extracted with chloro benzene. The chloro benzene layer is fractionated by means of a column of the Vigreux type. After the first run consisting of unreacted N-methyl-2-pyrrolidinone the reaction product distills at 124–127°/0.05 mm. in the form of a colorless oil. Yield: 141 g. N-methyl-3-phenethyl-2-pyrrolidinone (69% of the theoretical, based on the styrene).

Analysis.—Calc. for $C_{13}H_{16}NO$ (percent): C, 76.9; H, 8.4; N, 6.9; O, 7.9. Found (percent): C, 76.6; H, 8.4; N, 7.1; O, 8.0.

A higher-boiling fraction may be obtained from the distillation residue: 24 g. of a colorless oil distill at 175–180°/0.01 mm. When cooled down, this distillate solidifies to give colorless crystals which, after recrystallization from cyclohexane, have a melting point of 101–102°. Nuclear resonance and infrared spectra demonstrate that the product is N-methyl-3,3-diphenethyl-2-pyrrolidinone. This compound is obtained as principal product when the N-methyl-3-phenethyl-2-pyrrolidinone that distills at 124–127°G0.05 mm. is reacted with an equimolar amount of styrene.

Analysis.—Calc. for $C_{21}H_{25}NO$ (percent): C, 82.0; H, 7.9; N, 4.7; O, 5.2. Found (percent): C, 82.1; H, 8.1; N, 4.7; O, 5.2.

When the styrene in the first part of the example is replaced by α-methylstyrene, 1-methyl-3-(2-phenylpropyl)-2-pyrrolidinone (the 1:1 adduct) is obtained as a colorless oil having a boling point of 130–134°/0.1 mm., and 1-methyl-3-di(2-phenylpropyl)-2 - pyrrolidinone (the 2:1 adduct) is obtained in the form of a viscous oil having a boiling point of 180–182°/0.05 mm.

EXAMPLE 3

565 g. ε-caprolactam (5 mol), 520 g. styrene (5 mol), and 10 g. potassium methylate are heated with stirring to 100–105° for 20 hours and are subsequently stirred into 1 liter iced water. This mixture is neutralized with hydrocholric acid and extracted with 1.5 liter chloroform. The choroform extract is filtered from a little polycaprolactam and then distilled through a column of the Vigreux type. After a first run of 65 g. non-reacted ε-caprolactam (6%), 862 g. N-phenethyl-ε-caprolactam (79% of the theoretical) distill at 128–130°/0.05 mm. in the form of a colorless oil that crystallizes after having cooled down. Recrystallized from a 50–50 mixture of petroleum ether and cyclohexane, it is obtained in colorless crystal needles having a melting point of 49–50°.

Analysis.—Calc. for $C_{14}H_{19}NO$ (percent): C, 77.5; H, 8.8; N, 6.5; O, 7.4. Found (percent): C, 77.2; H, 8.7; N, 6.6; O, 7.6.

A nuclear resonance spectrum and infrared absorption show a substitution at the nitrogen atom.

The foregoing reactions may also be carried out with sodium methylate or sodium amide substituted for the potassium methylate. From N-methyl-ε-caprolactam and styrene in equimolar amounts with 0.1 mol potassium tertiary butylate per mol styrene, 1-methyl-3-phenethyl-ε-caprolactam is obtained in the form of a colorless oil having a boiling point of 150°/0.1 mm.

EXAMPLE 4

200 g. propylene urea (2 mol), 600 g. dimethyl formamide, 40 g. potassium tertiary butylate and 457 g. styrene (4.4 mol) are heated with stirring to 100–105° for 48 hours whereby the propylene urea gradually dissolves. After having cooled down, the reaction mixture is stirred into 2 liter iced water, neutralized with hydrochloric acid, and extracted with one liter chloroform. The chloroform layer is washed with water and then the solvent is distilled off.

The distillation residue (579 g.) is recrystallized from cyclohexane yielding crystalline N,N' - diphenethyl-propylene urea having a melting point of 61–63° (=84% of the theoretical).

Analysis.—Calc. for $C_{20}H_{24}N_2O$ (percent): C, 78.0; H, 7.8; N, 9.1. Found (percent): C, 77.6; H, 7.8; N, 9.2.

When reacting 1 mol styrene with 1 mol propylene urea, preferably with a small excess of the latter, N-phenethyl-propylene urea is obtained in good yield. After recrystallization from a mixture of cyclohexane and benzene, this product has a melting point of 136–137°. It forms a stable monohydrochloride having a melting point of 91–93°.

Analogously, N-phenethyl-ethylene urea having a melting point of 141–142° is obtained from ethylene urea and styrene.

The α-methyl styrene used in the foregoing examples is a pure material. On the other hand the styrene is a commercial product containing a very small amount of stabilizer that keeps it from polymerizing. Pure styrene can be used in place of the stabilized styrene but then some of the styrene will polymerize and thus form undesired by-product. It is accordingly preferred that whenever styrene is used as a reactant to add a little hydroquinone or other stabilizer in a concentration of $\frac{1}{10}$ of 1% by weight. Such addition can also be made to any other arylconjugated olefin used in the process of the present invention.

The lower alkyl substituents of the present invention are alkyl groups having from 1 to 6 carbon atoms such as methyl, ethyl, n-propyl, isopropyl, n-butyl, isobutyl, sec-butyl, tert-butyl, n-pentyl, isopentyl, pentyl-3-, n-hexyl, isohexyl, hexyl-2-, hexyl-3-, etc.

The aralkyl substituted lactams and cyclic ureas of the present invention are thermally stable, that is they show substantially no decomposition when heated to temperatures as high as 200° C. or even higher. These materials are also fairly low melting, or can be mixed with each other to make low melting mixtures so that they are highly suited for use as heat-transfer media. 1-methyl-3-(2-phenylpropyl)-2-pyrrolidinone can, for example, be mixed with an equal weight of 1-methyl-2-di(2-phenylpropyl)-2-pyrrolidinone to form a heat-transfer liquid that does not freeze at room temperatures. Because of the very low volatility of these materials they have an extremely high flash point and are suitable for substitution in place of the oil used for oil-immersion heating in chemical laboratories, for example.

What is claimed is:

1. A process for the production of aralkyl substituted lactams and cyclic ureas having the formula:

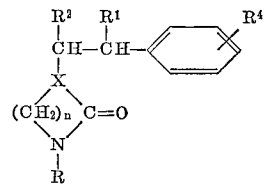

wherein:

R is hydrogen, lower alkyl or phenethyl,
R¹ and R² are hydrogen, lower alkyl or phenyl,
R³ is hydrogen or lower alkyl,
X is CH or N and
n is 2 to 7 which comprises heating at temperatures between 50 and 160° C., in the presence of an alkaline catalyst selected from the group consisting of alkali metal hydride, alkali metal amide, alkali metal hydroxide and alkali metal alcoholate, a lactam or cyclic urea of the formula:

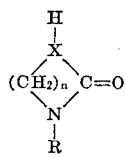

and an aryl conjugated olefin having the formula:

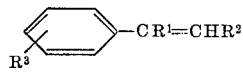

said alkaline catalyst being present in an amount of 0.01 to 1 mol per mol of aryl conjugated olefin.

References Cited

Chemical Abstracts I, vol. 55, Col. 27301 (1961) abstracting Tomisawa et al. "Yakugaku Zasshi" vol. 81, pp. 947–50 (1961).

Chemical Abstracts II, vol. 55. Col. 3589 (1961) abstracting Kametani et al. vol. 80, pp. 1182–92 (1960).

Möhrle Arch. Pharm., vol. 297, pp. 474–87 (1964).

Ziegenbein et al. "Chem. Ber." vol. 90, pp. 2291–2301 (1957).

Boekelheide et al. J. Am. Chem. Soc. vol. 75, pp. 3679–85 (1953).

Najer et al. I. Bull. Chem. Soc. Frame (1957) pp. 1069–72.

Najer et al. II Bull. Chem. Soc. France (1959) pp. 352–9.

Stamm "Chem. Ber." vol. 99, pp. 2556–65 (1966).

HENRY R. JILES, Primary Examiner

R. T. BOND, Assistant Examiner

U.S. Cl. X.R.

8—85; 252—77, 364; 260—30.2, 251, 294.7, 309.7, 326.5